(No Model.)
W. B. ATKINSON.
Fish Trap.
No. 237,231.          Patented Feb. 1, 1881.
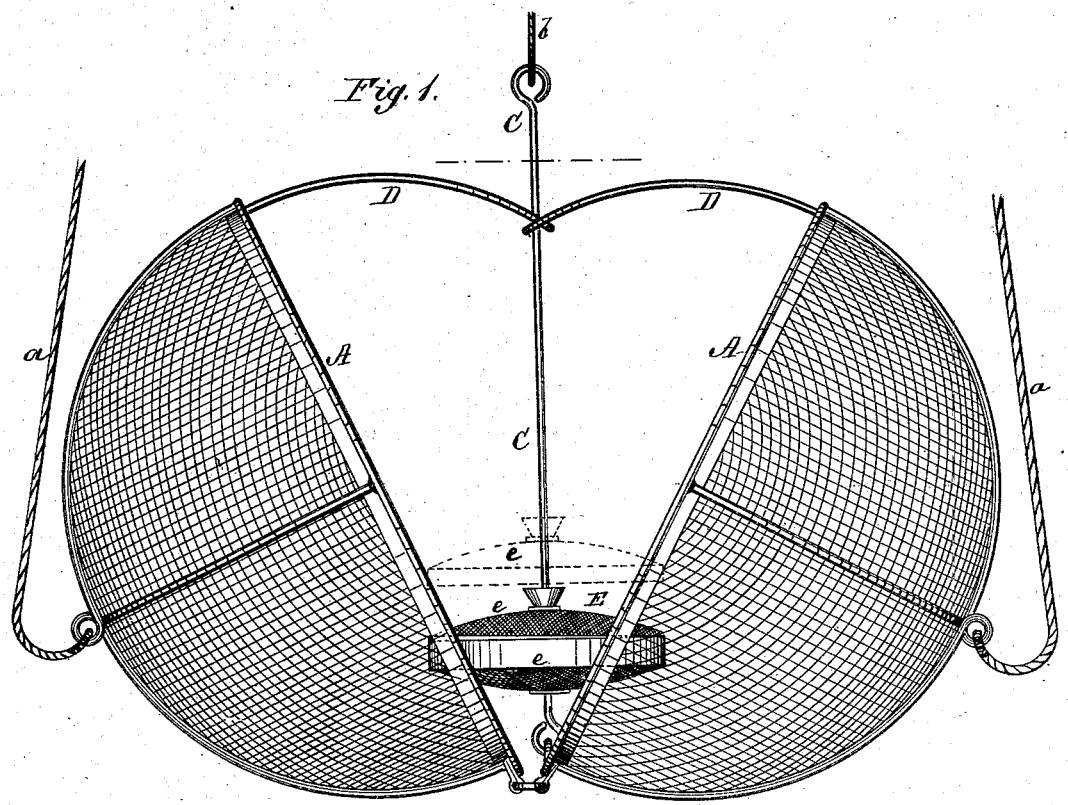
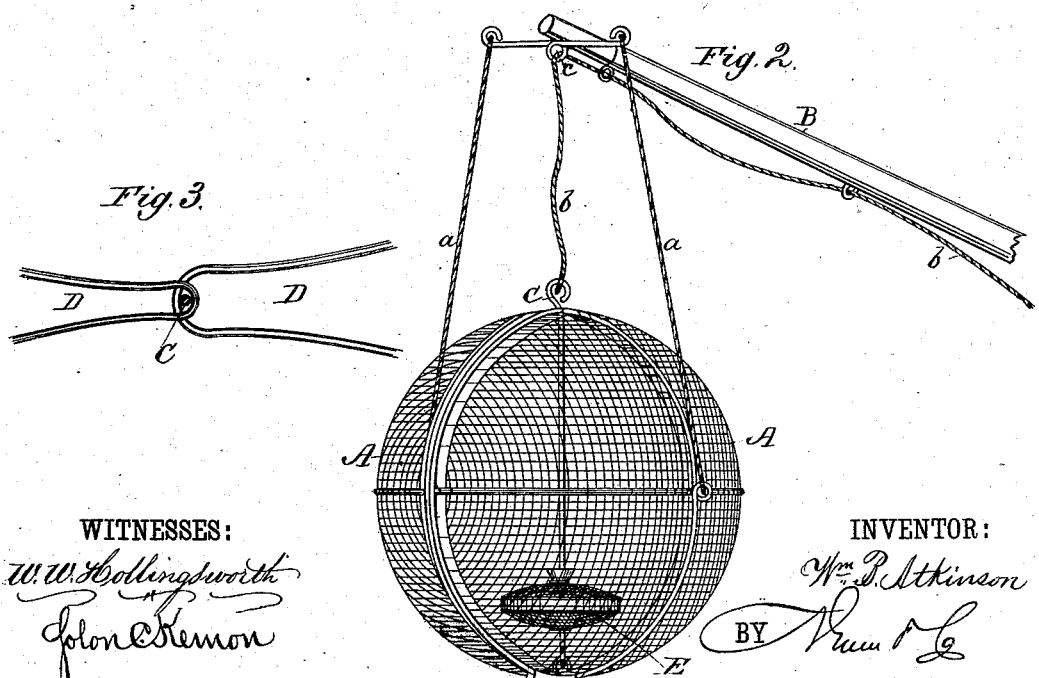
WITNESSES:
W. W. Hollingsworth
Solon C. Kemon
INVENTOR:
Wm. B. Atkinson
BY
ATTORNEYS.

UNITED STATES PATENT OFFICE.

WILLIAM B. ATKINSON, OF FRANKLIN, KENTUCKY, ASSIGNOR OF ONE-HALF TO MACEY & BROWN, OF NASHVILLE, TENNESSEE.

FISH-TRAP.

SPECIFICATION forming part of Letters Patent No. 237,231, dated February 1, 1881.

Application filed November 18, 1880. (No model.)

*To all whom it may concern:*

Be it known that I, WM. B. ATKINSON, a citizen of the United States, residing at Franklin, in the county of Simpson and State of Kentucky, have invented a new and Improved Fish-Trap; and I do hereby declare that the following is a full, clear, and exact description of the same, reference being had to the accompanying drawings, forming part of this specification.

My invention is an improvement in the class of fish-traps which are constructed of two hollow skeleton or wire jaws hinged together and having cords attached for closing them to imprison the fish.

The improvements relate to the means hereinafter described for suspending and opening the trap and for guiding the jaws when being opened; also, for supporting them when open at such an angle as will facilitate closing them quickly.

In the accompanying drawings, Figure 1 is a side view of the trap proper, showing its jaws open or set for catching minnows or other fish. Fig. 2 is a perspective view of the complete trap, showing its jaws closed. Fig. 3 is a detail sectional view, showing the arrangement of the guides or looped arms of the jaws, with the rod that passes through them.

As shown in the drawings, the body of the trap has a spherical form, and is constructed of woven wire and in two equal hollow parts or halves, A A, which constitute the jaws of the trap. Said jaws A A are hinged together at the lower side, and are closed and held closed by means of cords *a a*, attached to the middle of their outer sides. Such cords *a a* also constitute the means for suspending the trap from a pole, B, while lowering it into or raising it out of the water.

For the purpose of opening the trap and holding it open to allow the minnows to enter, I employ a third cord, *b*, which runs through an eye, *c*, on the head of the pole B and passes along the latter to the other end, where it is readily accessible to the fisherman. The other end of said cord *b* is connected with a rod, C, that is attached to the body of the trap near the hinge thereof, and extends up between the upper rims of the jaws A A and through loop-shaped guide-arms D D, which are rigidly attached to the upper portions of the respective jaws A A. These arms extend inward from the jaws, so that each surrounds the wire C and one slides over and partly within the other. When the cord *b* is subjected to tension, and the trap thereby opened, these looped arms D D prevent the jaws opening too far. The bait is placed in a woven-wire receptacle, E, which slides on the rod C. Said receptacle is composed of two parts, *e e*, one of which fits into the other and is held engaged therewith by friction of their contact edges. The receptacle prevents the bait being carried off into the water, but yet allows the minnows such access as is required for entrapping them.

In practical use the trap is manipulated and operates as follows: The two parts *e e* of the receptacle E are separated and the bait placed therein. By raising the pole B the trap-jaws A A will be closed, as shown in Fig. 2, and it is lowered into the water. Then by pulling the cord *b* the cords *a a* are relaxed, (because relieved of the weight of the trap,) and the jaws A A thereby opened as far as allowed by the arms D D, as shown in Fig. 1. When the minnows have assembled around the bait the fisherman lets go the cord *b* and suddenly raises the pole B simultaneously, thereby instantly closing the jaws A A and preventing escape of the minnows. The trap may then be safely raised from the water and discharged of its contents.

It is obvious the form and material of the body of the trap may be other than those here described without departing from the spirit of my invention. It is also practicable to operate the trap without the aid of a pole or rod, but not with the same ease or success.

In place of the looped or double arms D D, I may use chains or wires connected with the rod C; but the arms are preferable, since they serve as supports for the hinge by preventing too wide lateral movement of the jaws. The hinge may be constructed so as to allow the jaws to be detached from each other for nesting, packing, &c.; also, in place of using the rod C, the cord *b* may be extended down to the hinge of the jaws.

Having thus fully described my invention, what I claim, and desire to secure by Letters Patent, is—

1. In combination with the two hollow hinged jaws of the trap, the suspending and jaw-closing cords $a\ a$, attached as specified, and the cord $b$, connected with the hinge, for opening said jaws, substantially as specified.

2. The combination of the suspending-cords $a\ a$ and cord $b$ with the hinged jaws A A, the rod attached at or near the hinge, and arms attached to the upper portions of the jaws, so as to connect with the rod, substantially as and for the purpose specified.

3. The combination, with the hinged hollow jaws, of the cords $a\ a$ and $b$ and the pole or rod B, to which said cords are attached, substantially as shown and described, to operate as specified.

WILLIAM BROWNLOW ATKINSON.

Witnesses:
A. J. HAMMOND,
G. W. FARMER.